United States Patent [19]

Henken

[11] Patent Number: 4,648,423

[45] Date of Patent: Mar. 10, 1987

[54] CLUTCH-PRESSURE CONTROL VALVE

[75] Inventor: Fritz Henken, Pulheim, Fed. Rep. of Germany

[73] Assignee: Ford Motor Company, Dearborn, Mich.

[21] Appl. No.: 757,565

[22] Filed: Jul. 22, 1985

[51] Int. Cl.⁴ .......................................... G05D 16/10
[52] U.S. Cl. ................................... 137/494; 137/529; 251/337; 267/180
[58] Field of Search .................. 137/494, 529, 540; 192/0.033; 251/337; 267/180

[56] References Cited

U.S. PATENT DOCUMENTS

| | | | |
|---|---|---|---|
| 2,326,462 | 8/1943 | Johnson | 137/494 |
| 2,944,564 | 7/1960 | Pettey | 137/529 |
| 3,674,121 | 7/1972 | Copeland | 137/494 X |
| 4,540,018 | 9/1985 | Dantlgraber | 137/529 X |

FOREIGN PATENT DOCUMENTS 635003 2/1962 Italy .................................... 267/180

*Primary Examiner*—Robert G. Nilson
*Attorney, Agent, or Firm*—Frank G. McKenzie; Donald J. Harrington

[57] ABSTRACT

A clutch pressure control valve for a hydraulically actuated friction clutch which includes a valve spool 5 disposed within a valve bore and having two control collars 6 and 7. The spool is acted upon at one end by a linear compression spring 8 and a speed dependent pressure signal, the spool serving to regulate the clutch pressure by regulating the free cross section at an outlet port disposed between its control collars. To avoid the second order variation of the clutch pressure with speed, the control collars 6 and 7 of the valve spool 5 have two different diameters and the spool 5 is disposed within a stepped bore 2, 3 and 4. The end of the linear compression spring 8, remote from the valve spool 5, abuts a reaction piston 9, which is disposed within the valve bore and is acted upon on one side by the speed dependent pressure signal and on the other side by a second, non-linear compression spring 11, which is compressed between the reaction 9 and a shoulder 12 in the valve bore.

8 Claims, 2 Drawing Figures

CLUTCH-PRESSURE CONTROL VALVE

BACKGROUND OF THE INVENTION

1. Field of the Invention.

This invention relates to a clutch-pressure control valve for a hydraulically actuated friction clutch, particularly a clutch for use in a motor vehicle.

2. Description of the Prior Art.

A clutch pressure control valve of this type is disclosed in German Patent application No. P 34 04 378. This known valve has the disadvantage that the clutch pressure increases in proportion with the square of the speed because the pressure signal, which acts upon the valve spool, varies as the square of the speed. The optimum variation of the clutch pressure with speed, therefore, cannot be achieved or can only be achieved approximately.

SUMMARY OF THE INVENTION

The pressure control of the invention includes a valve spool disposed within a valve bore, which spool has two control collars and is acted upon at one end by a linear compression spring and a speed dependent pressure signal, the spool serving to regulate the clutch pressure by regulating the free cross section of an outlet port disposed between its control collars.

The present invention seeks to provide an improved clutch pressure control valve for a hydraulically actuated starting friction clutch, in which an improved variation of the clutch pressure with speed can be achieved.

According to the present invention, the control collars of the valve spool have two different diameters and the spool is disposed within a stepped bore. The end of a linear compression spring remote from the valve spool abuts a reaction piston, which is disposed in the valve bore and which is acted upon on one side by the speed dependent pressure signal (Pitot) and on the other side by a second, non-linear compression spring, which is compressed between the reaction piston and a shoulder in the valve bore.

The movement of the reaction piston acted upon by the speed dependent pressure, which varies as the square of the speed, is opposed by a non-linear compression spring, which imposes a non-linearity on the displacement of the reaction piston as pressure varies. The movement of the piston is not, therefore, proportional to the square of the speed as is the pressure acting upon the piston. The movement of the piston compresses the linear spring and exerts an additional force on the valve spool, proportional to the displacement of the reaction piston due to the speed dependent pressure. Therefore, by designing the non-linear compression spring in the form of a progressive spring, the effect of the pressure signal, which increases as the square of the speed, can be reduced.

Preferably, the force of the non-linear compression spring is calibrated in such a manner that at idling speeds the reaction piston remains in a rest position, whereby only the force of the linear compression spring acts on the clutch-pressure valve. The resulting clutch pressure, which leads to a slow crawling of the vehicle during idling, can then be kept constant despite variations in idling speeds.

At a specific partial load speed, the reaction piston may move to a second end position against the force of the non-linear compression spring to limit the clutch pressure.

The non-linear compression spring may be constructed in the form of a conical spring, a spring with varying pitch between the coils, or a spring with varying wire gauge, or it may comprise several separate springs of differing stiffness. In this way, the speed dependence of the clutch pressure may be varied within very wide limits.

BRIEF DESCRIPTION OF THE DRAWING

The invention will now be described further, by way of example, with reference to the accompanying drawing.

DESCRIPTION OF THE PREFERRED EMBODIMENT

Figure 1:
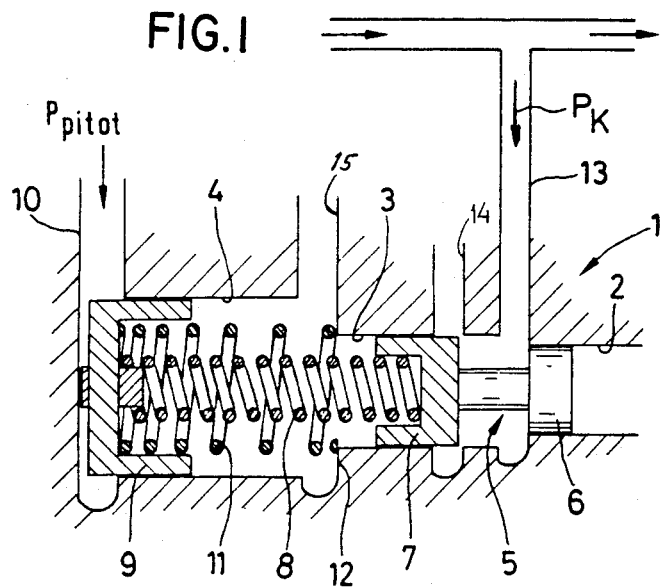
FIG. 1 is a diagrammatic view of an embodiment of a clutch-pressure control valve according to this invention.
Figure 2:
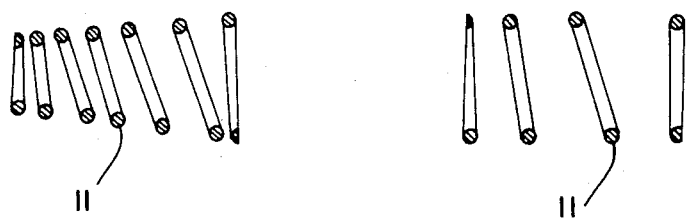
FIG. 2 shows several forms of the non-linear spring.

The clutch-pressure control valve 1 comprises a valve spool 5 located in a stepped valve bore having portions 2, 3 and 4 of different diameter. The valve spool 5 has two control collars or lands 6 and 7 and is acted upon at one end by a linear compression spring 8, which urges the spool 5 to the right-hand end of the valve bore. The other end of linear compression spring 8 acts on a reaction piston 9, which is disposed at the other end of the portion 4 of the valve bore. The force of spring 8 on piston 9 is opposed by a speed dependent pressure signal (Pitot) which is applied to the opposite face of the piston 9 by way of a duct 10. The piston 9 is further acted upon by a non-linear compression spring 11, the other end of which rests upon a shoulder 12 defined by the step between the portions 4 and 3 of the valve bore.

A constant supply pressure Pk, supplied by a hydraulic pump and its associated pressure regulation controls, acts upon the differential surfaces of the control collars 6 and 7. The spool 5 is acted upon on its left-hand end by the regulated clutch pressure. Furthermore, the spool is acted upon by the force of the linear compression spring 8, which force increases with the displacement of the piston 9 toward the right-hand side of the bore due to the speed dependent pressure acting against the force of the non-linear compression spring 11. The spool 5 moves to regulate the outlet clutch pressure by altering the cross section of the outlet port 14 located between the control collars 6 and 7 until, in the equilibrium position, the difference between the hydraulic forces acting on the spool equals the force of spring 8. The forces applied to the spool operate to change its position in the valve bore so that the regulated supply pressure is throttled through the variable cross section between collar 7 and clutch supply port 14. These forces, which maintain the clutch supply pressure constant while the position of the spool is constant and are in equilibrium, include the force of spring 8 and the net clutch supply pressure forces acting on collars 6 and 7. However, the magnitude of the force of spring 8 varies with the position of piston 9 as a function of the speed-dependent pressure force on piston 9 and the force of non-linear spring 11. Exhaust port 15 assures that no other pressure forces develop on spool 5.

The non-linear compression spring 11 is preferably designed so that at a pressure signal corresponding to engine idling speeds (for example, under 1200 r.p.m.)

the piston 9 remains in its left-hand end position, and, as the engine speed increases, the piston 9 moves to an increasing extent towards the right-hand end of the bore. However, at a specific predetermined partial load speed, piston 9 moves to its right-hand end position on the shoulder 12 of the valve bore. When the reaction piston 9 is in its left-hand end position, a constant crawling pressure of the clutch is established despite variations in idling speed. On the other hand, the force on the valve spool 5 is limited simply when the piston 9 reaches shoulder 12, its right-hand end position, at the predetermined partial load. The exit port 15 located between piston 9 and spool 5 assures that excess pressure will not develop in this region to prevent the seating of piston 9 on shoulder 12. The friction clutch engagement is controlled by the pressure in outlet port 14 by way of a hydraulic connection between the clutch and port 14.

By constructing the non-linear compression spring 11 in the form of a conical spring, or a spring with varying pitch between the coils or with a varying wire gauge, widely differing progressive spring force characteristics can be produced to counteract the second order variation of the pressure signal with speed.

Having described the preferred embodiment of my invention, what I claim and desire to secure by U.S. Letters Patent is:

1. A clutch pressure control valve for a hydraulically actuated friction clutch comprising:
   a source of hydraulic pressure;
   a valve bore communicating with the source of hydraulic pressure and having an outlet port from which the friction clutch is supplied;
   valve means movable within the valve bore for opening and closing communication between the outlet port and the hydraulic pressure source;
   a reaction piston movable within the valve bore;
   means for producing a force on the reaction piston whose magnitude varies non-linearly with the displacement of said reaction piston;
   means for producing a speed dependent pressure on the reaction piston that opposes the effect on the reaction piston of the non-linear force producing means; and
   means for producing a force on the valve means whose magnitude varies proportionally with changes in the distance between the valve means and the reaction piston.

2. The clutch pressure control valve of claim 1 wherein the force of the non-linear force producing means holds the reaction piston at one extremity of its travel in the valve bore away from the valve means when the speed dependent pressure corresponds substantially to the engine idle speed and permits the reaction piston to move to the opposite extremity of its travel in the valve bore when the speed dependent pressure corresponds to a partial load engine speed.

3. The clutch pressure control of claim 1 wherein the non-linear force producing means is a conical spring.

4. The clutch pressure control of claim 2 wherein the non-linear force producing means is a conical spring.

5. The clutch pressure control of claim 1 wherein the non-linear force producing means is a spring having varying pitch between the coils.

6. The clutch pressure control of claim 2 wherein the non-linear force producing means is a spring having varying pitch between the coils.

7. The clutch pressure control of claim 1 wherein the non-linear force producing means is a spring having a varying wire gauge.

8. The clutch pressure control of claim 2 wherein the non-linear force producing means is a spring having a varying wire gauge.

* * * * *